(12) United States Patent
Hairston

(10) Patent No.: US 12,327,269 B2
(45) Date of Patent: Jun. 10, 2025

(54) ADAPTIVE PROVISION OF GRAPHICAL COMMUNICATIONS IN DISPENSING ENVIRONMENTS

(71) Applicant: Wayne Fueling Systems LLC, Austin, TX (US)

(72) Inventor: Hob Hairston, Cedar Park, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 3 days.

(21) Appl. No.: 18/317,182

(22) Filed: May 15, 2023

(65) Prior Publication Data

US 2024/0386457 A1    Nov. 21, 2024

(51) Int. Cl.
| | |
|---|---|
| *G06Q 30/00* | (2023.01) |
| *G06Q 30/0207* | (2023.01) |
| *G06Q 30/0238* | (2023.01) |
| *G05B 19/418* | (2006.01) |

(52) U.S. Cl.
CPC ..... *G06Q 30/0236* (2013.01); *G06Q 30/0238* (2013.01)

(58) Field of Classification Search
None
See application file for complete search history.

(56) References Cited

U.S. PATENT DOCUMENTS

| | | | | |
|---|---|---|---|---|
| 9,888,105 | B2 * | 2/2018 | Rhoads | G06Q 10/10 |
| 10,144,396 | B1 * | 12/2018 | Krause | B60S 3/04 |
| 10,577,237 | B2 | 3/2020 | Fieglein | |
| 11,670,141 | B1 * | 6/2023 | Zalewski | G06Q 30/0633 |
| | | | | 705/26.8 |
| 2021/0081992 | A1 | 3/2021 | Gundappa et al. | |
| 2021/0150644 | A1 | 5/2021 | Morris et al. | |
| 2021/0357964 | A1 * | 11/2021 | Brannan | H04L 51/224 |
| 2022/0194401 | A1 * | 6/2022 | Gee | B60W 50/10 |
| 2022/0343267 | A1 | 10/2022 | Hairston | |

OTHER PUBLICATIONS

"Classifying a User as Driver or Passenger in a Vehicle Using Machine Learning" .ip.com. 2018 (Year: 2018).*
"International Search Report and Written Opinion received for PCT/US2024/028460, mailed on Jul. 19, 2024", 11 pages.

* cited by examiner

*Primary Examiner* — Maria V Vanderhorst
(74) *Attorney, Agent, or Firm* — Mintz, Levin, Cohn, Ferris, Glovsky and Popeo, P.C.

(57) ABSTRACT

A method for adapting and providing graphical communications in a dispensing environment is provided and can include receiving first data characterizing a vehicle in a dispensing environment and second data characterizing a vehicle operator. Vehicle attributes can be determined based on the first data and an identity of the operator can be determined based on the second data. Third data characterizing a graphical communication can be determined based on the attributes of the vehicle and the identity of the operator. The graphical communication can include graphical elements and can be determined for the operator based on fourth data characterizing a likelihood the operator will provide an input selecting a graphical element of the graphical elements included in the graphical communication. The graphical communication can displayed on a screen within the dispensing environment for viewing by the operator. Related systems and computer-readable mediums are also provided.

18 Claims, 10 Drawing Sheets

ADAPTIVE PROVISION OF GRAPHICAL COMMUNICATIONS IN DISPENSING ENVIRONMENTS

FIELD

Methods and systems for adaptively determining and providing graphical communications in a dispensing environment are provided.

BACKGROUND

Dispensing environments can provide fuel, electricity, gas, or similar consumable products or energy-generating materials to vehicles via dispensers. Vehicle operators can enter the dispensing environment to purchase fuel, gas, or electricity for their vehicle. Often, dispensing environments offer other items or services for purchase, such as food, drinks, vehicle maintenance equipment, vacuum, air, repair services, or car washes.

Dispensing environment owners usually rely on traditional modes of marketing such as word of mouth, signage, flyers, posters, and social media to attract customers and command revenue/sales sufficient to sustain profitability. However, at times it can be difficult to reach potential customers via these traditional marketing channels. Marketing outreach can be limited by production of physical materials, lack of suitable display locations or resources to display promotions, and the physical configuration or geographical area in which the dispensing environment is located may not be conducive for effective advertising via traditional marketing methods. For example, promotions directed to car wash services can be difficult to generate maximum sales returns because car wash utilization can be hampered by the seasonal nature of the car wash business in some locations, car wash downtime due to repair or the lack of available operators, or car wash waiting times.

As a result, dispensing environment owners may wish to dynamically determine and provide promotional offers that are adapted to vehicle operators for a variety of food, products, and/or services in order to maximize revenue and sales, optimize resource usage and profits of various services within the dispensing environment, retain existing customers, and grow service offerings to new customers. Thus, there exists a need for dynamically providing promotional offers that are customized to users of a dispensing environment.

SUMMARY

Methods and systems for adaptively determining and providing graphical communications in a dispenser environment are provided. Related apparatus, techniques, and articles are also described.

In one aspect, a method for adapting and providing graphical communications in a dispensing environment is provided. In one embodiment, the method can include receiving first data characterizing a vehicle present within a dispensing environment and second data characterizing an operator of the vehicle. The method can also include determining one or more attributes of the vehicle based on the first data. The method can further include determining an identity of the operator based on the second data. The method can also include determining third data characterizing at least one graphical communication. The third data can be determined based on the determined one or more attributes of the vehicle and the identity of the operator. The graphical communication can include one or more graphical elements and can be determined for the operator based on fourth data characterizing a likelihood the operator will provide an input selecting at least one graphical element of the one or more graphical elements included in the graphical communication. The method can further include providing the graphical communication on a display screen within the dispensing environment for viewing by the operator.

In another embodiment, the second data can include image or video data acquired by an image sensor within the dispensing environment, loyalty program data received from the operator when the vehicle is within the dispensing environment, or loyalty program data received from the operator when the vehicle is remote from the dispensing environment.

In another embodiment, the one or more attributes of the vehicle can further include a type of the vehicle, a size of the vehicle, or an amount of dirt on an exterior surface of the vehicle.

In another embodiment, the one or more attributes can be determined using a first predictive model trained in a first machine learning process based on first training data including image data or video data of vehicles.

In another embodiment, the third data can be determined using a second predictive model trained in a second machine learning process based on second training data including vehicle attribute data, the one or more graphical elements, the graphical communication, the likelihood the operator will provide the input selecting the at least one graphical element, and a frequency of operator inputs selecting the at least one graphical element included in the graphical communication.

In another embodiment, the at least one graphical element is associated with at least one of a car wash, a car wash discount, a food item, a food item discount, a volume of fuel, a fuel discount, a service, or a service discount.

In another embodiment, the second data can be received from a computing device in possession of the operator and the at least one graphical communication is transmitted to the computing device in possession of the operator.

In another embodiment, the at least one graphical communication can be adapted based on previous inputs provided by the operator selecting the at least one graphical element, previous graphical communications for which the operator did not select the at least one graphical communication element, previous graphical communications for which other vehicle operators provided inputs selecting the at least one graphical communication element, or previous graphical communications for which other vehicle operators did not provide inputs selecting the at least one graphical element.

In another embodiment, the receiving, the determining, and the providing can be performed by at least one data processor forming part of at least one computing system.

In another aspect, a system for adapting and providing graphical communications in a dispensing environment is provided. In an embodiment, the system can include a dispenser provided within a dispensing environment and configured to receive user inputs. The system can also include an image sensor communicatively coupled to the dispenser. The system can further include at least one data processor operatively coupled to the dispenser. The system can also include a memory storing instructions, which when executed, can cause the at least one data processor to perform operations including receiving first data characterizing a vehicle present within the dispensing environment and second data characterizing an operator of the vehicle.

The first data can include image data acquired via the image sensor. The operations can also include determining one or more attributes of the vehicle based on the first data. The operations can further include determining an identity of the operator based on the second data. The operations can also include determining third data characterizing at least one graphical communication. The third data can be determined based the determined one or more attributes of the vehicle and the identity of the operator. The graphical communication can include one or more graphical elements and can be determined for the operator based on fourth data characterizing a likelihood the operator will provide an input selecting at least one graphical element of the one or more graphical elements included in the graphical communication. The operations can also include providing the at least one graphical communication for display on a display screen of the dispenser for viewing by the operator.

In another embodiment, the second data can include image or video data acquired by the image sensor within the dispensing environment, loyalty program data received from the operator when the vehicle is within the dispensing environment, or loyalty program data received from the operator when the vehicle is remote from the dispensing environment.

In another embodiment, the one or more attributes of the vehicle can further include a type of the vehicle, a size of the vehicle, or an amount of dirt on an exterior surface of the vehicle.

In another embodiment, the one or more attributes can be determined using a first predictive model trained in a first machine learning process based on first training data including image data or video data of vehicles.

In another embodiment, the third data can be determined using a second predictive model trained in a second machine learning process based on second training data including vehicle attribute data, the one or more graphical elements, the graphical communication, the likelihood the operator will provide the input selecting the at least one graphical element, and a frequency of operator inputs selecting the at least one graphical element included in the graphical communication.

In another embodiment, the at least one graphical element is associated with at least one of a car wash, a car wash discount, a food item, a food item discount, a volume of fuel, a fuel discount, a service, or a service discount.

In another embodiment, the at least one graphical communications can be further determined based on at least one of an idle time of the vehicle within the dispensing environment, a time of day, a day of the week, a special event, a distance between the dispensing environment and a second dispensing environment, a location of the dispensing environment, a number of vehicle present within the dispensing environment, a car wash available time, or weather present at the dispensing environment.

In another embodiment, the second data can be received from a computing device in possession of the operator and the at least one graphical communication is transmitted to the computing device in possession of the operator.

In another embodiment, the at least one graphical communication can be adapted based on previous inputs provided by the operator selecting the at least one graphical element, previous graphical communications for which the operator did not select the at least one graphical communication element, previous graphical communications for which other vehicle operators provided inputs selecting the at least one graphical communication element, or previous graphical communications for which other vehicle operators did not provide inputs selecting the at least one graphical element.

In another embodiment, the receiving, the determining, and the providing can be performed by at least one data processor forming part of at least one computing system.

In another aspect, a computer-readable medium storing non-transitory computer-readable instructions for adapting and providing graphical communications in a dispensing environment is provided. The instructions, which when executed by a data processor, can cause the data processor to perform operations including receiving first data characterizing a vehicle present within a dispensing environment and second data characterizing an operator of the vehicle. The first data can include image data acquired via an image sensor communicatively coupled to a dispenser within the dispensing environment. The operations can also include determining one or more attributes of the vehicle based on the first data. The operations can further include determining an identity of the operator based on the second data. The operations can also include determining third data characterizing at least one graphical communication. The third data can be determined based on the determined one or more attributes of the vehicle and the identity of the operator. The graphical communication can include one or more graphical elements and can be determined for the operator based on fourth data characterizing a likelihood the operator will provide an input selecting at least one graphical element of the one or more graphical elements included in the graphical communication. The operations can further include providing the at least one graphical communication for display on a display screen of the dispenser for viewing by the operator.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Figure 1:
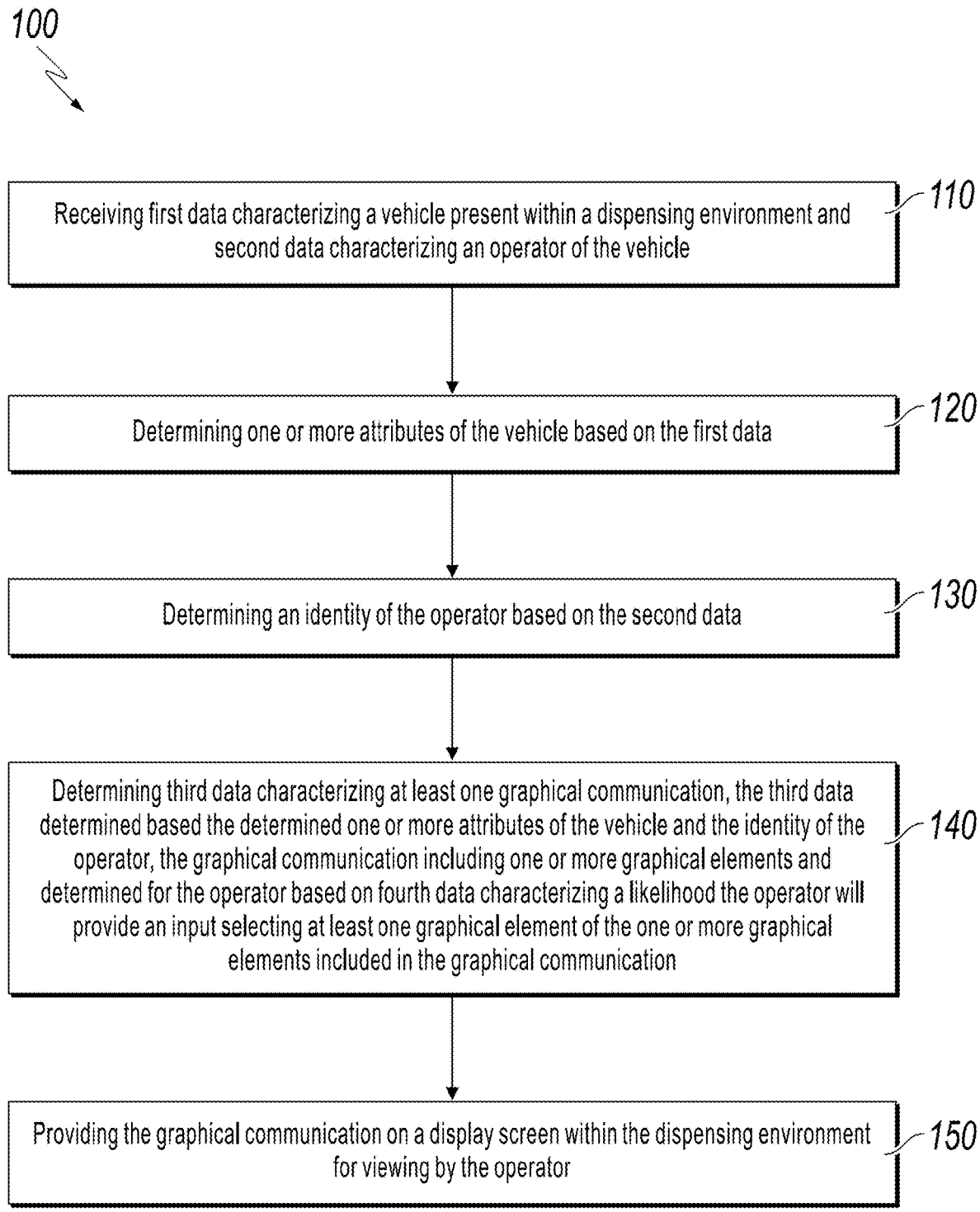
FIG. 1 is a process flow diagram illustrating an example method of adaptively determining, generating, and providing graphical communications within a dispensing environment.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

As described earlier, operators of dispensing environments seek to maximize sales and profits using existing resources in the most efficient manner possible. Traditional advertising and promotional marketing materials may fall short of capturing existing or new customers in order to increase sales and profits. Many traditional advertising and promotional materials and delivery methods provide generic materials to all users of the dispenser environment. As a result, users may be turned off by the promotional offers and fail to participate in the promotional offer. Thus, the probability a user will accept, agree, or otherwise participate or utilize a promotional offer may be low.

An improved promotional system would be able to adaptively determine and provide promotional offers based on specific characteristics of a user of the dispensing environment or the user's vehicle. For example, determining a user is a frequent visitor to a dispensing environment to purchase fuel, electricity, or gas, the system could determine that additional promotional offers could be provided to the user, such as a free car wash, or discounted product or service offering. The system, based on identifying the user, could adaptively determine and provide a graphical communication corresponding to a promotional offer that is specifically tailed for the identified user and/or their vehicle. Adaptively determining and providing promotional offers can increase sales and profits for dispensing environment operators where generic promotional and marketing techniques fall short to engage new and existing customers in a purchase. The likelihood or probability of the user accepting the promotional offer to make an unplanned or additional purchase can be used to determine a value of the promotion so that the user is presented with a promotion they are most likely to accept. The graphical communications can be displayed or provided to the user in a variety of manners described herein.

In general, a system for adaptively determining, generating, and providing graphical communications in a dispensing environment, and methods for use thereof, are provided. The graphical communications can correspond to advertisements, promotions, coupons, rebates, or marketing materials associated with product or service offerings available in the dispensing environment or in related locations or contexts associated with an operator of the dispensing environment. The graphical communication could correspond to an offer for a fuel discount, an electricity discount, a gas discount, a car wash, a beverage, a diagnostic or repair service, or the like. The system can dynamically and adaptively determine promotional offers of varying values that can be presented to a user such that the user is most likely to accept the offer and the operator of the dispensing environment is most likely to accrue a sale or purchase that they may not have achieved in the absence of the graphical communication.

FIG. 1 is a process flow diagram illustrating an example process 100 of some implementations of the current subject matter that can provide for adaptive determination and provision of graphical communications in a dispensing environment.

At 110, a first data characterizing a vehicle present within a dispensing environment can be received. The first data can include image data, such as still image data or video image data, which includes the vehicle within the fuel dispensing environment. Additionally, at 110, second data characterizing an operator of the vehicle can also be received. The second data can include image data, such as still image data or video image data, which includes the operator of the vehicle. In some embodiments, the second data can include data characterizing the operator of the vehicle that is received prior to the operator's presence within the dispensing environment. In some embodiments, the vehicle can display a loyalty program identifier, such as a sticker or decal, on the vehicle that can be included in the image data. The loyalty program identifier can identify the vehicle and the operator of the vehicle.

In some embodiments, the first data and the second data can include non-image data. For example, the first data and the second data can include loyalty program data identifying the vehicle and the operator of the vehicle. The loyalty program data can be associated with the dispensing environment. In some embodiments, the loyalty program data can include a loyalty program account number, a credit card associated with the operator of the vehicle and the loyalty program account, a loyalty program status, and a purchase history of transactions performed by the operator of the vehicle. In some embodiments, the first data and the second data can be received prior to the vehicle entering the dispensing environment. For example, the first data and the second data can be received as a result of the operator of the vehicle logging into a loyalty program application configured on a computing device associated with the operator of the vehicle.

At 120, one or more attributes of the vehicle can be determined based on the first data. The first data can include one or more attributes of the vehicle such as a make, model, size, shape, style, fuel-type, height, length, width, color, window style, type, age or condition of the vehicle.

The one or more attributes of the vehicle can be determined from the first data using a computer vision algorithm or the like configured to receive the first data as an input and to output attributes of the vehicle. In some embodiments, the computer vision algorithm can include an image classifier. The image classifier can perform pixel-wise classification and segmentation analysis of the first data to determine the attributes of the vehicle. In some embodiments, the image classifier can be implemented using one or more image classification methods, including template matching, low-order Markov chains, Hilbert space-filling curves, Markov meshes, or dependency trees.

In some embodiments, the one or more attributes of the vehicle can be determined using loyalty program data stored in a database. For example, upon receiving first data associated with a loyalty program of the dispensing environment, the one or more attributes of the vehicle can be determined based on the loyalty program data.

At 130, an identity of the operator of the vehicle can be determined based on the second data. The identity of the operator can be determined from the second data using a computer vision algorithm configured to receive the second data as an input and to output the identity of the vehicle operator. In some embodiments, the computer vision algorithm can include an image classifier. The image classifier can perform pixel-wise classification and segmentation analysis of the second data to determine the attributes of the vehicle. In some embodiments, the image classifier can be implemented using one or more image classification methods, including template matching, low-order Markov chains, Hilbert space-filling curves, Markov meshes, or dependency trees. In some embodiments, the identity of the operator can include a sex of the vehicle operator.

In some embodiments, the identity of the operator can be determined using loyalty program data stored in a database. For example, upon receiving second data associated with a loyalty program of the dispensing environment, the identity of the vehicle operator can be determined based on the loyalty program data.

At 140, third data characterizing at least one graphical communication can be determined. The third data can be determined based on the one or more attributes of the vehicle and/or the identity of the vehicle operator. In some embodiments, a predictive algorithm can be configured to receive as inputs the determined attributes of the vehicle and the determined identity of the vehicle operator and to generate as outputs a graphical communication. In some embodiments, the third data can include a graphical communication associated with products or goods offered for sale within the dispensing environment. In other embodiments, the third data can include a graphical communications associated with good or services offered for sale outside of the dispensing environment, such as at a neighboring business location or a preferred partner/vendor location away from the location of the dispensing environment.

The predictive algorithm can also receive additional input data including, but not limited to a buying profile of the vehicle operator, a buying profile of the vehicle, weather data corresponding to a location at which the dispensing environment is located, and utilization or availability data associated with one or more products, services, or facilities included in the dispensing environment, such as a car wash facility. For example, the additional input data can include car wash availability data or car wash utilization data. The utilization and/or availability data can be obtained from a database or from sensors configured within the dispensing environment. A buying profile of the vehicle operator can include historical data associated with purchases the vehicle operator has made in the past. The buying profile of the vehicle operator can be associated with the vehicle to determine a buying profile of the vehicle. In some embodiments, the buying profile of the vehicle can be determined based on a buying or purchasing history associated with any occupant of the vehicle and need not necessarily be based on the buying or purchasing history of the vehicle operator. Based on historical data corresponding to previous purchases made by the vehicle operator or any of its occupants, graphical communications associated with goods or services can be provided when the vehicle is present within the dispensing environment.

The graphical communication can be determined for a particular operator of the vehicle based on fourth data characterizing a likelihood the operator of the vehicle will provide an input selecting at least one graphical element of those included in the graphical communication. The predictive algorithm can determine the graphical communication by determining a promotion probability score for a product or a service based on the first data, the second data, and/or additional data inputs including but not limited to the purchase history of the vehicle operator, the buying profile of the vehicle operator, the vehicle buying profile, weather data corresponding to the location at which the dispensing environment is located, and/or utilization or availability data associated with one or more services or facilities included in the dispensing environment, such as car wash availability data or car wash utilization data. The promotion probability score can correspond to a likelihood or probability that the vehicle operator will engage with a graphical communication and provide an input to engage with, select, or otherwise accept the contents of the graphical communication. Thus, the promotion probability score can reflect the likelihood that the vehicle operator will participate in the promotion and conduct a transaction for a product or service identified in the graphical communication.

In some embodiments, a single probability purchase score can be determined for a product or service. In other embodiments, multiple probability purchase scores can be determined for a product or service. For example, a range of promotion probability scores can be determined, such as a high, medium, or low promotion probability score. Based on the determined promotion probability score, a promotion value can be determined by the predictive algorithm. The promotion value can be included in the graphical communication. For example, based on determining a low promotion probability score, the predictive algorithm can determine that a high promotion value should be provided. In this example, based on the first and second data, the predictive algorithm determined that there was a low probability the vehicle operator would engage with a graphical communication to participate in a promotional offer for a product or service. The predictive algorithm can then further determine that a high promotion value should be provided, such as offering the product or service at no-cost, for free, or as complimentary in order to influence the vehicle operator to participate in the promotion and engage with the graphical communication to purchase the product or service offered in the graphical communication. Lower promotion values can be associated with higher promotion probability scores and medium promotion values can be associated with medium promotion probability scores. Although, the aforementioned is described in broad categories, such as high, medium, and low, a variety of associative relationships between the promotion probability scores and promotion values can be envisioned without limit.

Based on determining the promotion value, a new or adapted graphical communication including the promotion and associated promotion value can be determined. The graphical communication can be associated with a promotion, advertisement, marketing offer, or the like for goods or services available within the dispensing environment. The graphical communication can identify the promotion being offered and can include graphical elements corresponding to a price, a location, a timing, a service, and/or a product or item associated with the promotion. The graphical elements can also include user-input selections configured to indicate the user has accepted or declined a promotion identified in the graphical communication. The graphical communication and/or the graphical elements can include textual data, graphical data, and/or computer-executable content, which when executed can cause a computing system to take further action. For example, upon receiving an input to a graphical element accepting a free car wash promotion, the graphical element can be configured to execute programmatic functionality to cause a voucher for the free car wash to be printed at a dispenser or a point-of-sale device within the dispensing environment, or transmitted to a computing device of the vehicle operator.

At 150, the graphical communication can be provided on a display screen within the dispensing environment for viewing by the operator. For example, graphical communications can be displayed to the vehicle operator at a dispenser, a point-of-sale device or terminal, or a computing device viewable by the vehicle operator. In some embodiments, providing the graphical communication can include storing the graphical communication in a database. In some embodiments, the graphical communication can be provided on a display screen outside of the dispensing environment, such as on a computing device associated with the vehicle operator and/or a computing device configured with a loyalty program application associated with the dispensing environment.

Figure 2:
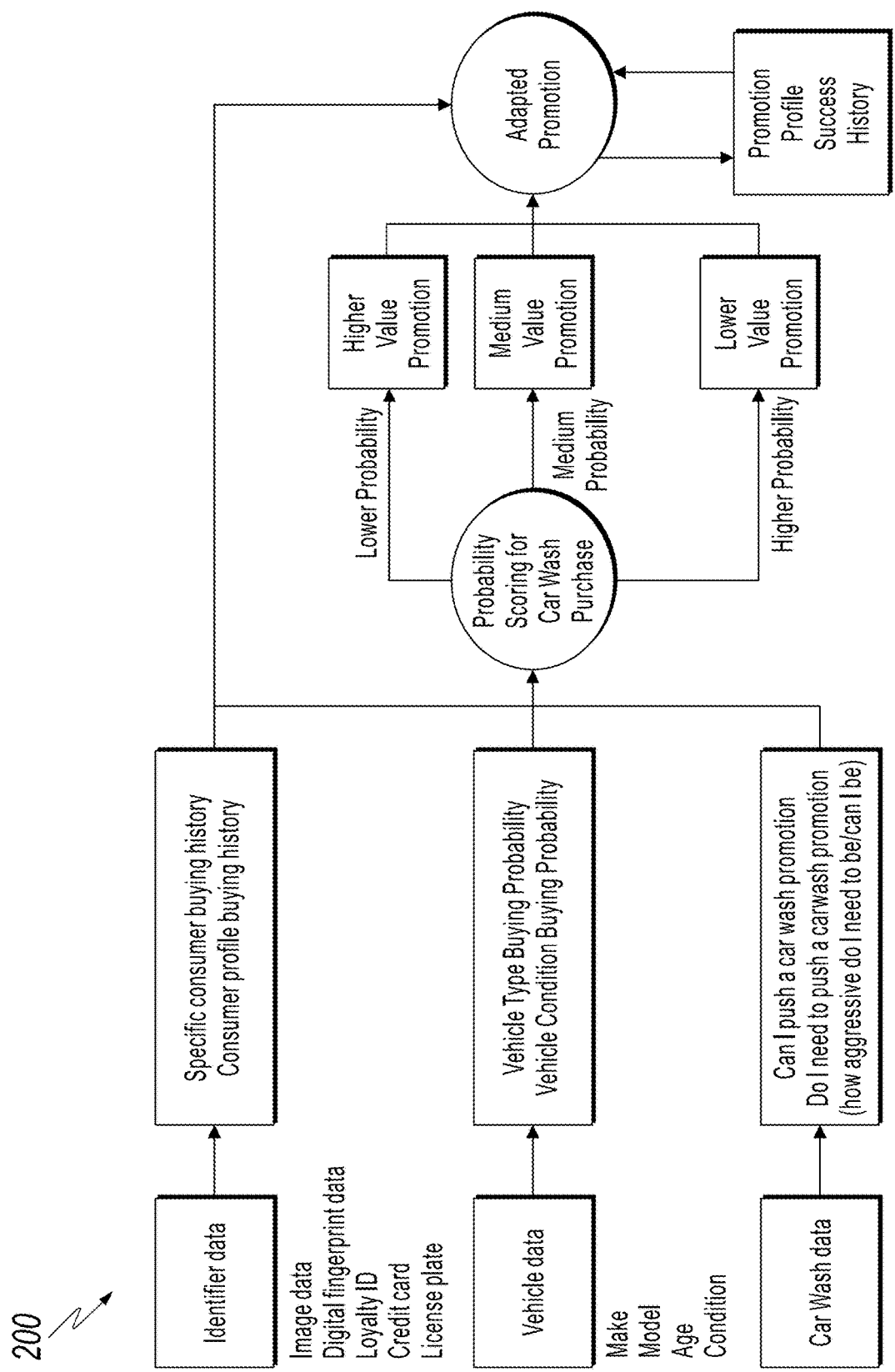
FIG. 2 is a diagram illustrating an exemplary embodiment of a data processing architecture configured to perform the method of FIG. 1.

FIG. 2 illustrates one exemplary embodiment of a data processing architecture 200 of the predictive algorithm described herein. As shown, identifier data (e.g., second data associated with the vehicle operator), vehicle data (e.g., first data associated with the vehicle driven by the vehicle operator), and additional input data (e.g., car wash data in this example), can be received and used to determine a promotion probability score. For example, the identifier data can include image data, digital fingerprint data, loyalty account number or ID data, credit card data, or license plate data which can identify the operator of the vehicle (or the vehicle). Having determined an identity of the vehicle operator, additional second data can be determined such as a buying history of the identified vehicle operator or a consumer profile buying history of vehicle operators who are determined to be similar to the vehicle operator. Buying or purchasing histories can include historical data associated with purchases made by a vehicle operator or a vehicle occupant based on identifying the vehicle operator or the vehicle. Purchase data can be associated with a vehicle operator or vehicle based on identifying the vehicle operator or the vehicle using one or more sensors present within the dispensing environment. For example, one or more sensors configured in the dispensing environment can be configured to track the vehicle operator or occupants of the vehicle from a location in the forecourt of the dispensing environment to a point-of-sale device located in a facility adjacent to the forecourt, such as a convenience store.

Vehicle data can include a make, model, age, or condition of the vehicle, although a variety of other vehicle attributes can be included as the first data. Based on the vehicle data (e.g., the first data), a vehicle type buying probability and a vehicle condition buying probability can be determined. A vehicle type buying probability can be a probability that an operator of a vehicle being the same type as the vehicle determined via the first data will accept a promotion and provide an input as such to a graphical communication identifying the promotion. A vehicle condition buying probability can be a probability that an operator of a vehicle having the same condition as the vehicle condition determined via the first data will accept a promotion and provide an input as such to a graphical communication identifying the promotion, such as vehicles determined to have a condition that is clean or dirty.

Additional input data can include data that is specific to utilization or availability of a product or service. For example, as shown in FIG. 2, car wash data can include a car wash availability (e.g., open, closed, waiting time, length of queue, or the like) and a car wash utilization (e.g., frequently used, moderately used, never used, or the like). Based on the utilization or availability data, a graphical communication associated with a promotion of goods or services of the dispensing environment can be generated. For example, if a car wash is busy, a graphical communication can be generated which can offer an incentive for the vehicle operator to wait to use the car wash. In another example, a graphical communication can be generated and can provide a promotion to increase a utilization of the car wash, perhaps if the car wash it not being utilized or is under-utilized for a particular period of time.

Based on the identifier data (e.g., the first data), the vehicle data (e.g., the second data), and additional input data a promotion probability score can be determined as shown in FIG. 2. In some embodiments, the promotion probability score can be determined based on the buying history of the identified vehicle operator and/or the consumer profile buying history of vehicle operators who are determined to be similar to the vehicle operator. In some embodiments, the promotion probability score can be determined based on the vehicle type buying probability and/or the vehicle condition buying probability. In some embodiments, the promotion probability score can be determined based on indicator data associated with the additional input data corresponding to availability or utilization of a product, service, or facility associated with the dispensing environment. The indicator data can include data about the product for which the promotion probability score is being determined, such as whether or not the product has been purchased before, if the product has or is a complimentary product, availability of a product or service, as well as a particular need associated with the product.

A range of promotion probability scores can be determined, and for each promotion probability score, a corresponding promotion value can be determined. The promotion value can be incorporated into a graphical communication that has been adapted based on the first data, second data, and additional input data. The graphical communication can include one or more graphical elements providing additional content associated with the promotion. Additionally, a promotion profile success history can be determined for graphical communications determined according to the systems and methods described and stored, for example, in a database.

The promotion profile success history can include a record, for each graphical communication (e.g., associated with a particular promotion), identifying whether or not the vehicle operator accepted the promotion (e.g., provided an input selecting at least one graphical element in the graphical communication) or declined the promotion (e.g., did not provide an input selecting at least one graphical element in the graphical communication). Graphical communications that are associated with particular promotions can be evaluated to determine which are more successful and least successful in view of particular input data. For example, graphical communications promoting wine sales may be more successful for vehicle types that are luxury automobiles, while graphical communications promoting beer sales may be less successful for luxury automobiles but more successful for vehicle types that are trucks. In another example, a graphical communication associated with a carwash having immediate availability may be less successful for a vehicle operator who frequently purchases a carwash, the vehicle type is a luxury automobile, and the car is dirty. In this way, the systems and methods herein can determine how different combinations of input data can determine a promotion profile success history.

Figure 3:
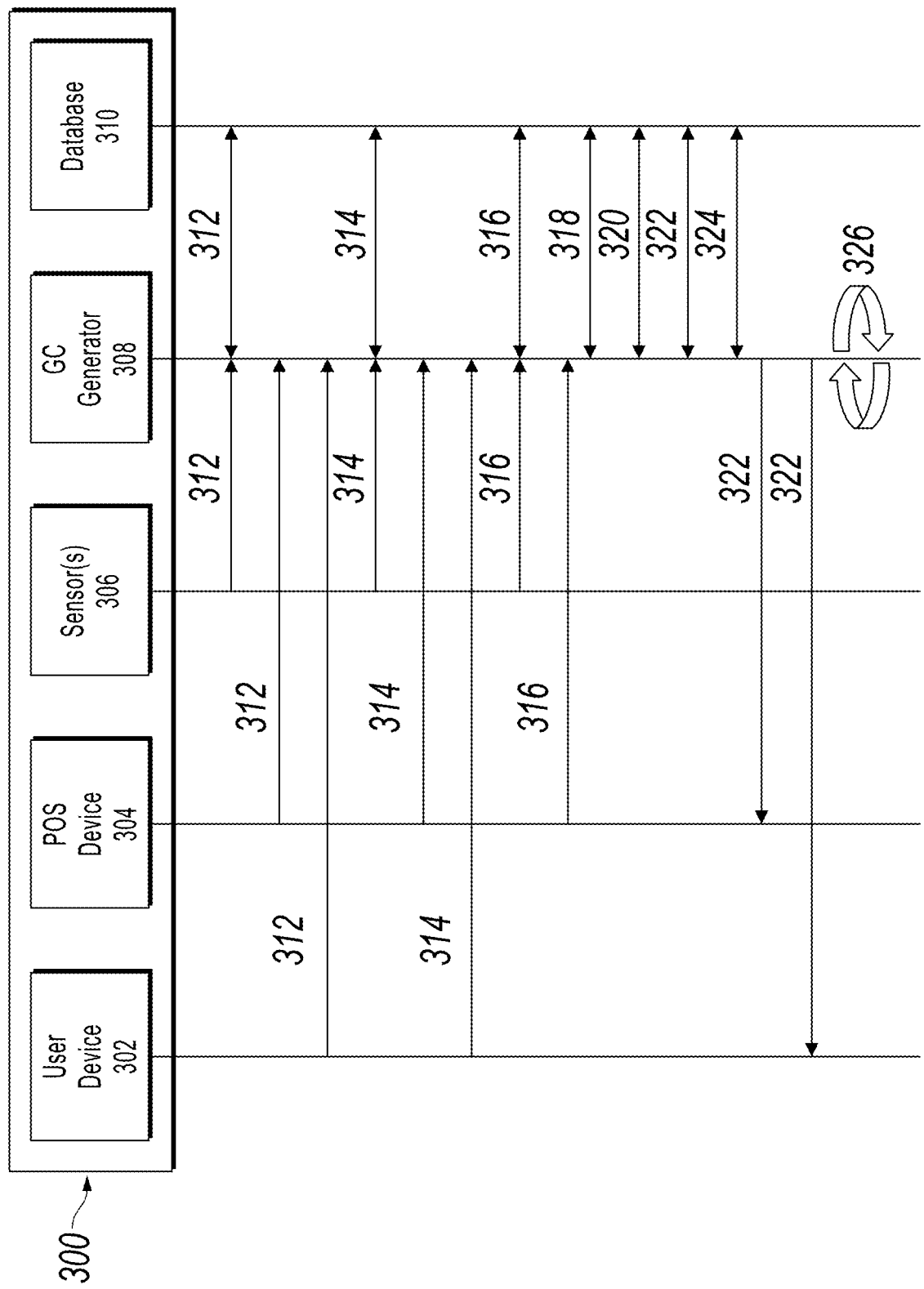
FIG. 3 is a diagram illustrating an exemplary embodiment of a dataflow executed by performing the method of FIG. 1.

FIG. 3 is a dataflow diagram corresponding to the method 100 described in relation to FIG. 1 using the exemplary data processing architecture 200 of FIG. 2. The dataflow of FIG. 3 can be performed by the system 300, which can include a user device 302, a point-of-sale (POS) device 304, one or more sensors 306, a graphical communication (GC) generator 308, and a database 310. The system 300 can be configured to adaptively determine, generate, and provide graphical communications associated with promotions offered within a dispensing environment.

First data 312 characterizing a vehicle present within a dispensing environment can be provided to and/or received at the GC generator 308 from the user device 302, the POS device 304, one or more sensors 306 and/or the database 310. Additionally, second data 314 characterizing an operator of the vehicle can be provided to and/or received from user device 302, the POS device 304, one or more sensors 306 and/or the database 310. Additionally, or alternatively, the GC generator 308 can receive additional input data 316 from the POS device 304, sensors 306, and/or the database 310. The GC generator can determine one or more vehicle attributes 318 based on the first data 312 and an identity 320 of the vehicle operator based on the second data 314. In some embodiments, the one or more vehicle attributes 318 and the identity 320 of the vehicle operator can be provided to and/or received from the database 310.

Responsive to determining the one or more vehicle attributes 318 and the identity 320 of the vehicle operator, the GC generator 308 can determine third data 322 including a graphical communication including graphical elements providing textual, graphical, and/or computer-executable content related to a promotion associated with the dispensing environment. In some embodiments, the third data 322 can be provided to and/or received from the database 310. The GC generator 308 can determine fourth data 324 characterizing a likelihood the operator will provide an input selecting at least one graphical element in the graphical communication. In some embodiments, the additional input data 316 can be further used to determine the fourth data 324. Based on the fourth data 324, the GC generator 308 can determine the third data 322. In some embodiments, fourth data 324 can be provided to and/or received from the database 310. The determined third data 322 can be provided to the POS device 304 and/or the user device 302 for viewing by the operator of the vehicle. The GC generator 308 can iteratively 326 perform one or more aspects of the dataflow based on new or updated first data 312 and/or second data 314 received from any of the user device 302, the POS device 304, sensors 306, and/or the database 310.

Figure 4:
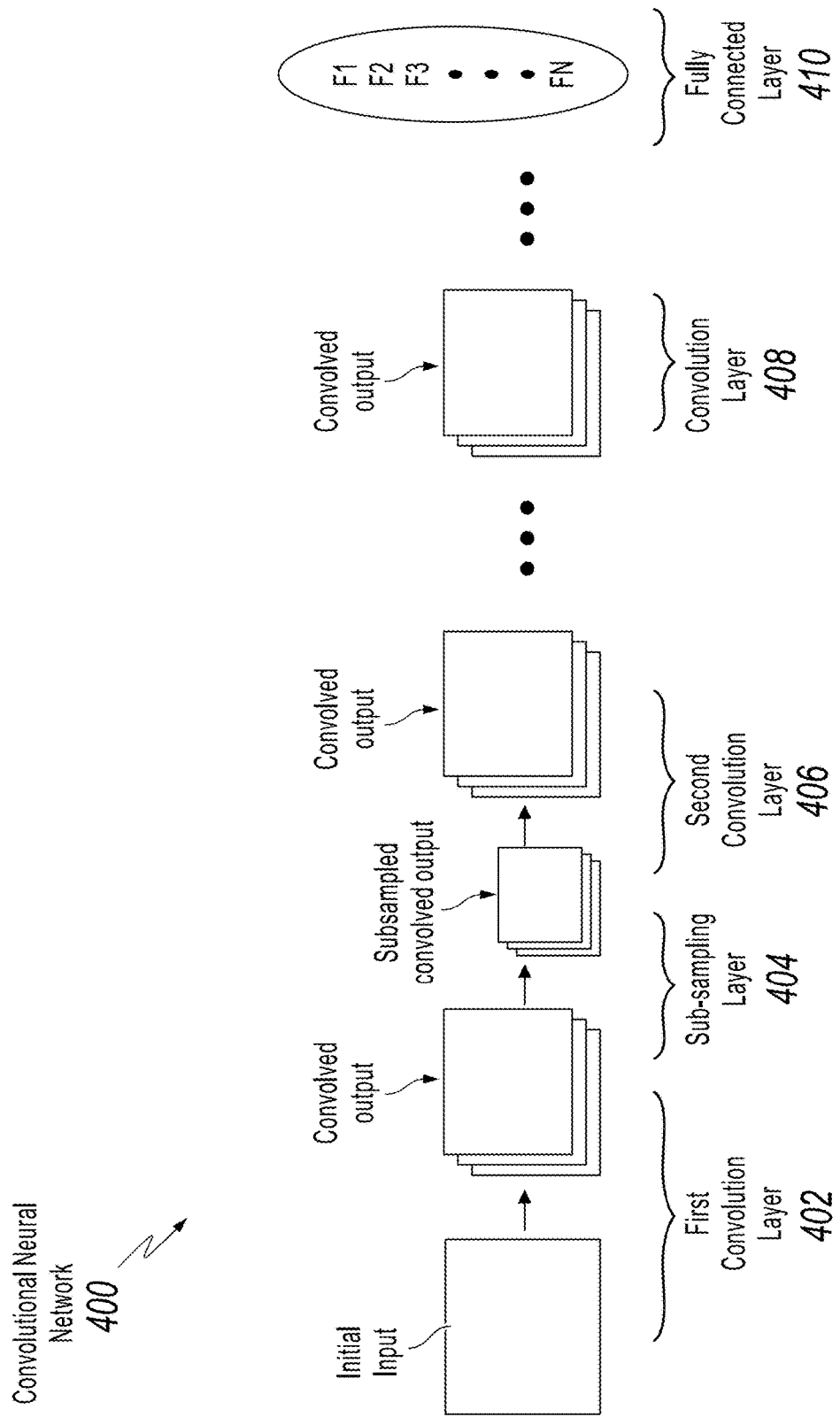
FIG. 4 is a diagram illustrating an exemplary embodiment of a predictive algorithm used in the method of FIG. 1.

Referring now to FIG. 4, illustrated is a diagram of an implementation of a machine learning model that can be provided as a predictive algorithm as described herein. The predictive algorithm can be implemented in the graphical communication generator 308 of the system 300 as described in relation to FIG. 3. More specifically, illustrated is a diagram of one implementation of a convolutional neural network (CNN) 400 that can be configured to determine, generate, and output graphical communications as described herein. For purposes of illustration, the following description of CNN 400 will be with respect to an implementation of CNN 400 by the GC generator 308 described in relation to the system 300 of FIG. 3. However, it will be understood that in some examples CNN 400 (e.g., one or more components of CNN 400) can be implemented by other systems different from, or in addition to, the GC generator 308 such as a loyalty program application, a dispensing environment promotion planning system, or a local dispensing environment management system. While CNN 400 includes certain features as described herein, these features are provided for the purpose of illustration and are not intended to limit the present disclosure.

CNN 400 includes a plurality of convolution layers including first convolution layer 402, second convolution layer 406, and convolution layer 408. In some embodiments, CNN 400 includes sub-sampling layer 404 (sometimes referred to as a pooling layer). In some embodiments, sub-sampling layer 404 and/or other subsampling layers have a dimension (i.e., an amount of nodes) that is less than a dimension of an upstream system. By virtue of sub-sampling layer 404 having a dimension that is less than a dimension of an upstream layer, CNN 400 consolidates the amount of data associated with the initial input and/or the output of an upstream layer to thereby decrease the amount of computations necessary for CNN 400 to perform downstream convolution operations. Additionally, or alternatively, by virtue of sub-sampling layer 404 being associated with (e.g., configured to perform) at least one subsampling function, CNN 400 consolidates the amount of data associated with the initial input.

The GC generator 308 performs convolution operations based on system 300 providing respective inputs and/or outputs associated with each of first convolution layer 402, second convolution layer 406, and convolution layer 408 to generate respective outputs. In some examples, the GC generator 308 implements CNN 400 based on the GC generator 308 providing data as inputs to first convolution layer 402, second convolution layer 406, and convolution layer 408. In such an example, the GC generator 308 provides the data as inputs to first convolution layer 402, second convolution layer 406, and convolution layer 408 based on the GC generator 308 receiving the first data 312, second data 314, and/or additional input data 316 from the user device 302, the POS device 304, the sensors 306, and/or the database 310.

In some embodiments, the GC generator 308 provides data associated with an input (referred to as an initial input) to first convolution layer 402 and the GC generator 308 generates data associated with an output using first convolution layer 402. In some embodiments, the GC generator 308 provides an output generated by a convolution layer as input to a different convolution layer. For example, the GC generator 308 provides the output of first convolution layer 402 as input to sub-sampling layer 404, second convolution layer 406, and/or convolution layer 408. In such an example, first convolution layer 402 is referred to as an upstream layer and sub-sampling layer 404, second convolution layer 406, and/or convolution layer 408 are referred to as downstream layers. Similarly, in some embodiments the GC generator 308 provides the output of sub-sampling layer 404 to second convolution layer 406 and/or convolution layer 408 and, in this example, sub-sampling layer 404 would be referred to as an upstream layer and second convolution layer 406 and/or convolution layer 408 would be referred to as downstream layers.

In some embodiments, the GC generator 308 processes the data associated with the input provided to CNN 400 before the GC generator 308 provides the input to CNN 400. For example, the GC generator 308 processes the data associated with the input provided to CNN 400 based on the GC generator 308 normalizing sensor data (e.g., image data from sensors 306, and/or the like).

In some embodiments, CNN 400 generates an output based on the GC generator 308 performing convolution operations associated with each convolution layer. In some examples, CNN 400 generates an output based on the GC generator 308 performing convolution operations associated with each convolution layer and an initial input. In some embodiments, the GC generator 308 generates the output and provides the output as fully connected layer 410. In some examples, the GC generator 308 provides the output of convolution layer 408 as fully connected layer 410, where fully connected layer 410 includes data associated with a plurality of feature values referred to as F1, F2 . . . FN. In this example, the output of convolution layer 408 includes data associated with a plurality of output feature values that represent a prediction.

In some embodiments, the GC generator 308 identifies a prediction from among a plurality of predictions based on the GC generator 308 identifying a feature value that is associated with the highest likelihood of being the correct prediction from among the plurality of predictions. For example, where fully connected layer 410 includes feature values F1, F2, . . . FN, and F1 is the greatest feature value, the GC generator 308 identifies the prediction associated with F1 as being the correct prediction from among the plurality of predictions. In some embodiments, the GC generator 308 trains CNN 400 to generate the prediction. In some examples, the GC generator 308 trains CNN 400 to generate the prediction based on the GC generator 308 providing training data associated with the prediction to CNN 400.

Although, the predictive algorithm of the GC generator 308 is described in relation to a CNN, a variety of machine learning algorithms may selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, and Maximum Information Spanning Trees (MIST).

Figure 5:
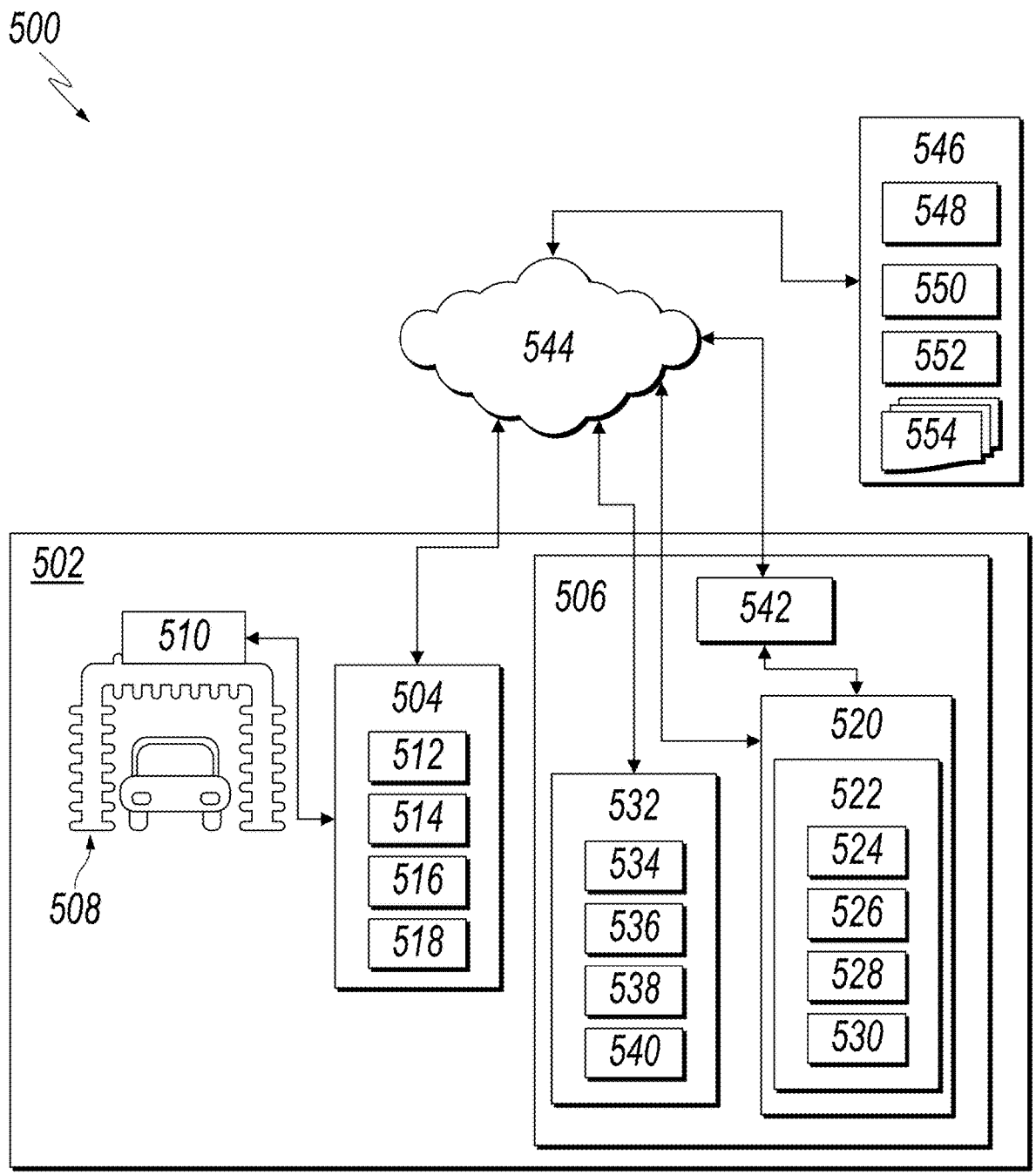
FIG. 5 is a diagram illustrating an exemplary embodiment of a system for adaptively determining, generating, and providing graphical communications within a dispensing environment according to the method of FIG. 1.

FIG. 5 is a system diagram illustrating an example system 500 that incorporates some implementations of the current subject matter and that can provide for the same for adaptively determining and providing graphical communications within a dispensing environment. For example, the system 500 can correspond to the system 300 described in relation to FIGS. 3 and 4. As shown in FIG. 5, some components of the system 500 can be configured in a dispensing environment 502, such as a retail location at which fuel is sold along with other products and services. Within the dispensing environment 502, one or more computing devices 504 and a forecourt 506 can be provided. The computing devices 504 can be associated with a retail operation, such as a convenience store at which food products and automotive services can be sold. For example, the computing device 504 can correspond to the POS device 304 described in relation to FIG. 3. In some embodiments, the computing device 504 may not be a POS device but can be a computing device arranged within the dispensing environment at which data associated with a vehicle or operator of the vehicle can be acquired.

In some embodiments, the computing device 504 can be a POS device associated with a carwash 508 configured within the dispensing environment 502. The car wash 508 can include one or more sensors 510 that can exchange data with the computing device 504. For example, the sensors 510 can convey car wash availability data and/or car wash utilization data to the computing device 504. For example, the sensors 510 can include image sensors, flow rate sensors, or the like associated with operation and utilization of the car wash 508. In some embodiments, the sensors 510 can generate image data used to determine one or more vehicle attributes and/or image data identifying an operator of a vehicle.

The computing device 504 can include a memory 512 storing computer-executable instructions, which when executed by a processor 514, cause the processor to execute one or more applications associated with operation and control of the car wash, as well as car wash transactions. The computing device 504 can also include a display 516 configured to provide graphical communications as described herein. The computing device 504 can also include one or more input devices 518 such as a microphone, optical scanner, keypad, or the like at which a vehicle operator can provide inputs or data associated with the vehicle or their identity. In some embodiments, inputs can be provided by a user in regard to a graphical communication via the display 516 and/or the input devices 518.

The dispensing environment 502 can also include a forecourt 506. The forecourt 506 can include an area of the dispensing environment in which fuel bays are located for dispensing fuel via one or more dispensers 520. In some embodiments, the dispensing environment 502 can include dispensers configured to dispense other types of "fuel" besides petroleum fuel. For example, the dispensers 520 can be configured to dispense electricity, gas (e.g., hydrogen, liquid propane gas (LPG) or compressed natural gas (CNG), water, or the like. It will be understood that the dispensing environment 502 and the dispensers 520 described herein are not limited to petroleum gasoline in liquid format and that other types of dispensers configured to dispense alternate types of "fuel" can be envisioned.

The dispenser 520 can include a computing device 522. The computing device 522 can include at least one data processor 524 configured to perform one or more aspects of the functionality described herein, and memory 526 for storing computer-executable instructions for performing one or more aspects of the functionality described herein. The computing device 520 can also include an display 528 that is configured to present graphical communications to the dispenser user. The computing device 520 can also include one or more input devices 530 such as a microphone, optical scanner, keypad, or the like at which a vehicle operator can provide inputs and/or data associated with dispensing fuel. In some embodiments, inputs can be provided by a user via the display 528 and/or the input devices 530.

In some implementations, as shown in FIG. 5, the system 500 can include a computing device 532 associated with, corresponding to, or in possession of a vehicle operator. As shown, the computing device 532 can be located within the forecourt 506, such as when the vehicle operator is dispensing fuel via the dispenser 520. In other embodiments, the computing device 532 may not be located within the forecourt 506 or the dispensing environment 502. The computing device 532 can include at least one data processor 534 configured to perform one or more aspects of the functionality described herein, and a memory 536 for storing instructions for performing one or more aspects of the functionality described herein. The computing device 532 can also include a screen or display 538 that is configured to present graphical communications and other data related to the dispensing environment 502. The computing device 532 can also include one or more input devices 540 such as a microphone, optical scanner, camera, keypad, or the like at which a vehicle operator can provide inputs and/or data associated with operation of the computing device 532. In some embodiments, inputs can be provided by the user via the display 538 and/or the input devices 540. In some embodiments, the memory 536 may store a loyalty program application associated with the operator of the vehicle. The loyalty program application can include first data characterizing the vehicle and/or second data characterizing the identity of the vehicle operator.

The computing devices 504, 522, and 532 can be communicatively coupled to one another and to a server 546 via a network 544. The network 544 can include, for example, any one or more of a personal area network (PAN), a local area network (LAN), a campus area network (CAN), a metropolitan area network (MAN), a wide area network (WAN), a broadband network (BBN), a virtual private network (VPN), the Internet, or the like. Further, the network 544 can include, but is not limited to, any one or more of the following network topologies, including a bus network, a star network, a ring network, a mesh network, a star-bus network, tree or hierarchical network, or the like.

In some embodiments, the dispenser 520 can be communicatively coupled to the network 544 via a forecourt controller 542. The forecourt controller 542 can be configured to control operations of the dispenser 520. In some embodiments, the dispenser 520 can be communicatively coupled to the network 544 without a forecourt controller 542.

As further shown in FIG. 5, the system 500 can include a server 546 that is configured to perform operations that adaptively determine, generate, and provide graphical communications associated with the dispensing environment 502. In some embodiments, the server 546 (and/or the network 544) can be configured within the dispensing environment 502. The server 546 can include at least one data processor 548 configured to perform one or more aspects of the functionality described herein, and a memory 550 for storing computer-executable instructions for performing one or more aspects of the functionality described herein. In some embodiments, the server 546 can include a database 552 (e.g., corresponding to database 310 of FIG. 3), which can store data associated with the functionality described herein. For example, the database 552 can store first data 312, second data 314, additional input data 316, as well as loyalty program data.

As explained in further detail below, the server 546 can include one or more modules 554 or programs of computer-executable instructions performing one or more aspects of the subject matter described herein using the at least one data processor. For example, in some implementations, the modules 554 can include one or more components of a machine learning architecture, such as the CNN 400 described in relation to FIG. 4 and the dataflow of FIG. 3. The modules 554 can include one or more training algorithms that can be trained and deployed as predictive algorithms configured to adaptively determine, generate and provide graphical communications associated with promotions of the dispensing environment 502. The modules 554 can include feature selectors configured to train a prediction algorithm using subsets of features associated with the first data, second data, and/or the loyalty program data.

The system and methods described herein can be implemented using an architecture that can be deployed in a variety of configurations. In one embodiment, aspects of the system can be deployed on premise within a dispensing environment, or the system could be deployed remotely from the dispensing environment. In some aspects, portions of the system can be deployed on premise and other portions can be deployed remotely. Latency benefits can be gained by deploying the system on premise but these configurations can also be more costly and can require specialized computing resources, such as accelerated hardware or processors. It can be advantageous to locate computing equipment configured with the predictive models or algorithms described herein on-premise, or remotely via a web-services or containerized or virtualized architecture depending on network availability and robustness.

Figure 6B:
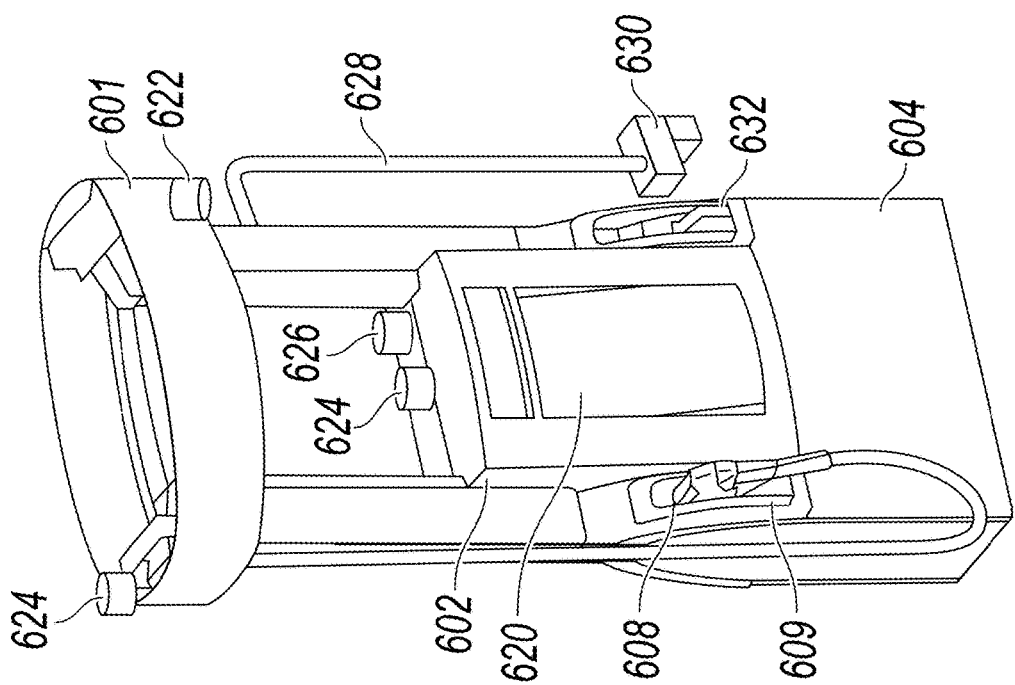
FIG. 6B is a front perspective view of the dispenser shown in FIG. 6A.
Figure 6A:
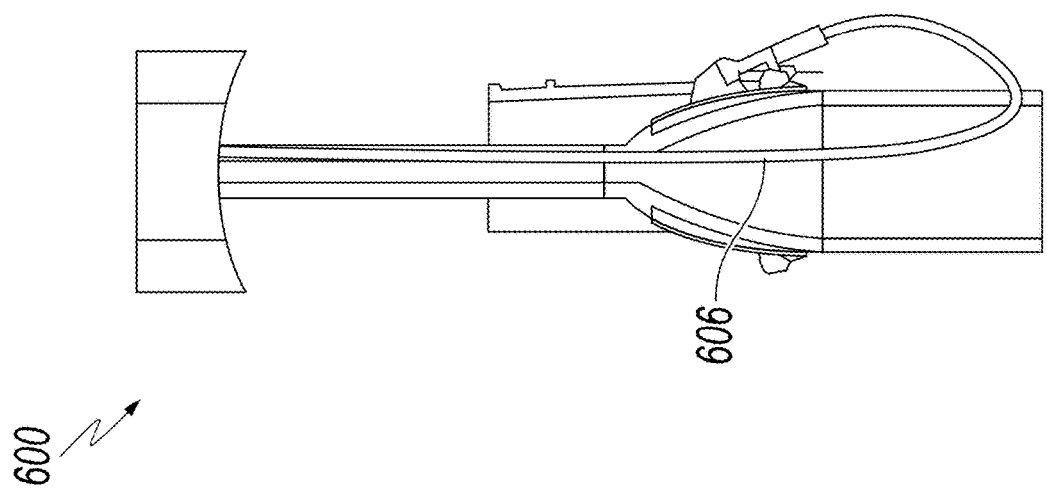
FIG. 6A is a side perspective view of one embodiment of a dispenser.
Figure 7:
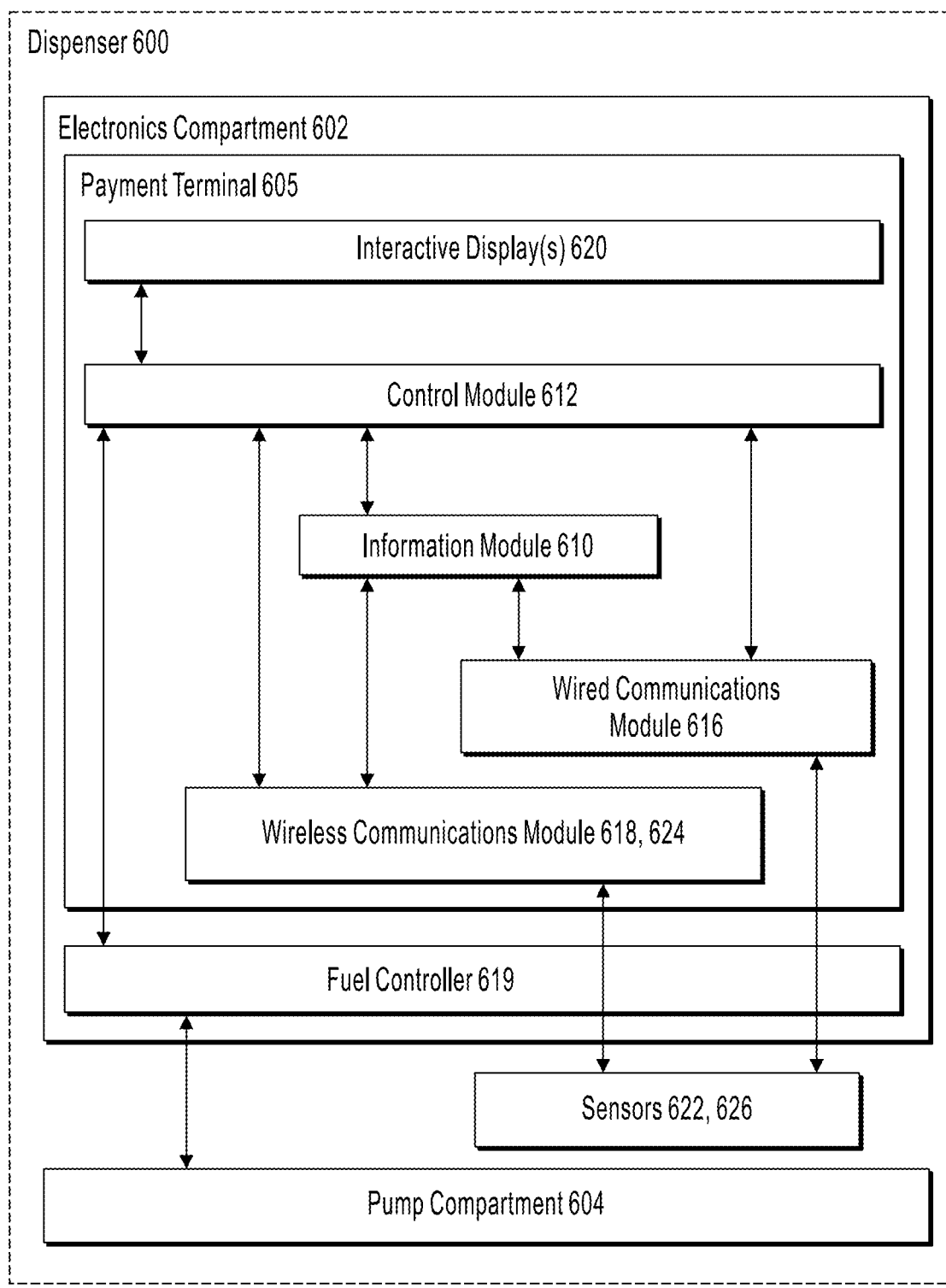
FIG. 7 is a diagram showing internal components of the dispenser of FIGS. 6A and 6B.

FIGS. 6A and 6B illustrate one embodiment of a dispenser 600 that can be used in some implementations of the current subject matter, and FIG. 7 illustrates components of the dispenser 600. The dispenser 600 can correspond to dispenser 520 described earlier. The fuel dispenser 600 can be configured to dispense liquid petroleum fuel and/or electricity. In general, the dispenser 600 includes a dispenser body 601 having an electronics compartment 602, a pump compartment 604, and an image sensor 622. The pump compartment 604 houses a pump configured to pump fuel from a fuel tank or other reservoir, as well as one or more meters that can be configured to monitor fuel flow, flow of fuel additives, and/or flow of other components of the fuel. The pump compartment 604 can also include other components to facilitate fuel dispensing and mixing, such as motors and valves, a strainer/filtering system, a vapor recovery system, and the like. The pump compartment 604 is isolated from the electronics compartment 602 within the dispenser 600 to facilitate safety, security, and/or maintenance, as will be appreciated by a person skilled in the art. Fuel is thus not allowed to flow from the pump compartment 604 to the electronics compartment 602 and instead flows from the pump compartment 604 through hose 606 to a nozzle 608 for dispensing. As will be appreciated by a person skilled in the art, the nozzles 608 are each configured to dispense fuel from the dispenser 600 as pumped therefrom by the pump. The dispenser 600 also includes a nozzle receptacle 609 configured to store the nozzle 608 when not in use.

In some implementations, the dispenser 600 can include one or more components configured to send and/or receive data. For example, dispenser 600 can include a wireless transceiver 624 positioned on the electronics compartment 602 or elsewhere on the dispenser 600, such as on the dispenser body 601. The wireless transceiver 624 can be communicably coupled to the wireless communications module 618. In some embodiments, the wireless transceiver 624 can be a Bluetooth wireless transceiver configured to exchange data with a computing device via short-range radio signals. In some embodiments, one or more sensors 626 can be coupled to the dispenser 600. For example, one or more sensors 626 can include image sensors configured to acquire image data associated with the vehicle or the operator of the vehicle at the dispenser 600.

In some implementations, the dispenser 600 can be configured to dispense electricity and can include several components for dispensing the electricity. For example, dispenser 600 can be configured as an electric vehicle charger. In such embodiments, the dispenser 600 can include a charging cable 628 coupled to the dispenser body 601 at one end and configured to deliver electricity to a charging connector 630 coupled to an opposite end. The charging connector 630 can be configured to couple to a charging port of a vehicle (not shown) and to deliver the electricity provided by the dispenser 600, via the charging cable 628, to the vehicle when coupled to the charging port. When not in use, the charging connector 630 can be stored in a charger receptacle 632 formed on the dispenser body 601.

Although the dispenser 600 is described in relation to dispensing petroleum-based fuels, some or all of the functionality discussed herein may be used to adaptively determine and provide graphical communications for presentation on an alternative dispenser. For example, in some embodiments, the dispenser 600 can include a hydrogen dispenser, a liquefied petroleum gas (LPG) dispenser, a compressed natural gas (CNG) dispenser, or the like.

The electronics compartment 602 houses electronics for facilitating payment for fuel, controlling operation of the dispenser to facilitate dispensing of fuel, and for providing graphical communications and receiving inputs from a vehicle operator selecting graphical elements included in the graphical communication. For example, the electronics compartment 602 can include a fuel controller 619 that, at least in some implementations, includes a data processor, memory, and storage forming part of at least one computing system. The fuel controller 619 is configured to control dispensing of the fuel from the pump compartment 604. The electronics compartment 602 also includes a payment terminal 605 that is configured to provide a user with one or more options to create a desired fuel mixture, receive instructions characterizing the desired fuel mixture, receive payment information and/or user identification information from a user, transmit and receive the payment information and/or the user identification information with a POS system, and deliver fueling instructions to the fuel controller 619 to dispense fuel. The payment terminal 605 can also be configured to provide a user with information related to a status of fueling. For example, the payment terminal can display an amount of fuel that has been dispensed, and a corresponding fuel cost as the fuel mixture is dispensed.

The payment terminal 605 can be configured to facilitate communication between a user and the fuel controller 619, and can include an interactive display 620 and an information module 610. The information module 610 can, at least in some implementations include a data processor, memory, and storage, forming part of at least one computing system. The payment terminal 605 can also include one or more wired communication modules 616 and/or wireless communication modules 618 and a control module 612 that, at least in some implementations includes a data processor, memory, and storage, forming part of at least one computing system. The communication modules 616, 618 can function to allow data to be transmitted to and from various components within the payment terminal 605 via wired and/or wireless communication, respectively. For example, the communication modules 616, 618 can be configured to transmit and receive signals that can characterize, e.g., payment information, vehicle operator identification information, vehicle attribute data, loyalty program data, and/or information regarding a desired fuel selection, via wired and/or wireless communications, respectively. The wireless communication module 618 can include, e.g., a transceiver for communicating via Bluetooth protocol (e.g., wireless transceiver 624), cellular protocol, WI-FI protocol, near field communication (NFC), and/or a radio frequency identification (RFID) protocol. Wired and/or wireless communication via the communication modules 616, 618 can be according to any of a variety of communication protocols, e.g., TCP/IP, etc., as will be appreciated by a person skilled in the art. The communication modules 616, 618 are also in operable communication with the image sensors 622, 626 and are configured to receive image data acquired by the image sensors 622, 626. The communication modules 616, 618 can additionally transmit the received image data for further external processing as described elsewhere herein.

The interactive display 620, which can be, or can include, a touchscreen. The interactive display 620 can be operably coupled to the control module 612 which can be used to control, dynamically rearrange, and/or update a graphical communication or a graphical user interface (GUI) rendered on the display 620. The display 620 can be configured to show information (e.g., media content, fuel selection options, payment information, user or vehicle identification information, loyalty program data, or the like) in the form of one or more graphical elements, or graphical objects, receive input (e.g., instructions for a desired fuel mixture, user identification information, payment information, acceptance/denial of a promotion identified via the graphical communication etc.) thereon, and can deliver data characterizing the input to the control module 612 to be processed.

Some examples of information that the display 620 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a vehicle that will consume the fuel, such as vehicle make, model, mileage, and the like. The user can also be provided with a recommend fuel blend which they can choose to select. The control module 612 can be further configured to receive from and/or control the one or more sensors 622, 626.

To facilitate payment, the information module 610 can be configured to receive input such as, e.g., user identification information and/or payment information, and deliver the information to the control module 612. For example, the information module 610 can include a barcode and/or QR code scanner, and/or a NFC contactless card reader for receiving payment information, user identification information, vehicle information, and/or loyalty program information.

In some embodiments, the information module 610 be operably coupled to the image sensors 622, 626 for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module 610 can include a palm reader and or/fingerprint reader which can scan a palm and/or finger of the user to obtain user identification information. In some embodiments, the user identification information can be associated with a loyalty rewards identifier automatically. Accordingly, in some embodiments, a predetermined payment method, and user preferences, can be determined based on user identification information.

As shown in FIG. 7, the information module 610 can be operably coupled to the wired communication module 616 and/or the wireless communication module 618. The wired and wireless communication modules 616, 618 can allow the information module 610 to send and receive payment information and/or user identification information to and from a mobile device such as a smart phone, tablet, laptop, and the like, that is in electronic communication with the information module 610 via the wired and/or wireless communication modules 616, 618. Although the wireless communication module 618 is shown to be located within the payment terminal, the wireless communication module 618 can be located elsewhere on, within, or in the vicinity of, the dispenser 600. For example, the wireless communication module 618 can be mounted on top of the dispenser, which can facilitate retrofitting the wireless communication module 618 to existing dispensers and/or facilitate repair, upgrade, or other maintenance of the communication module 618, as described in U.S. Pat. No. 10,577,237 filed on Jun. 14, 2016 and entitled "Methods and Devices for Fuel Dispenser Electronic Communication," which is incorporated by reference herein.

Figure 8:
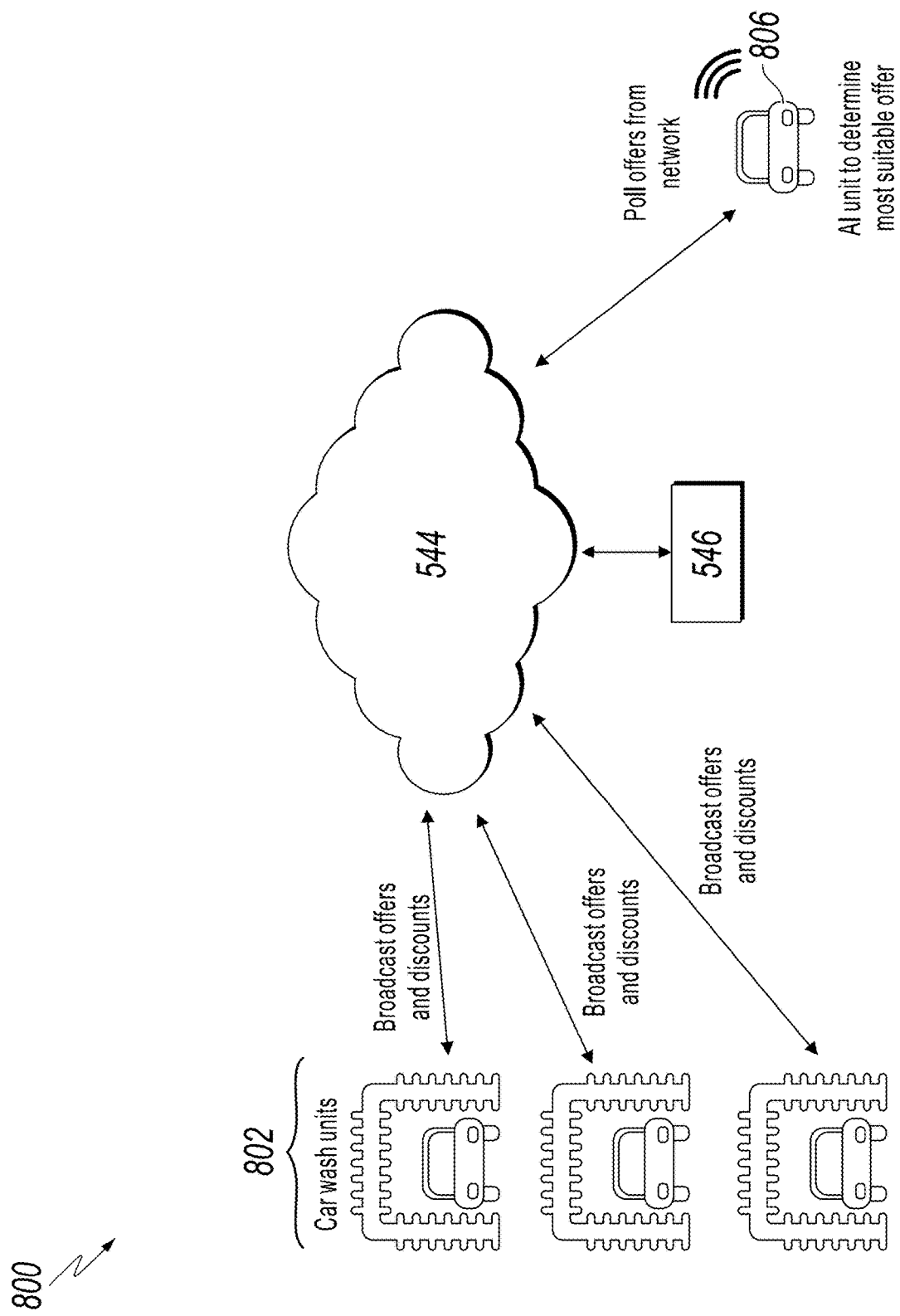
FIG. 8 is a diagram illustrating components of an example system for the optimized utilization and promotion of car wash services.

FIG. 8 is a schematic view illustrating components of an example system 800 for the optimized utilization and promotion of car wash services. As shown, the system 800 can include at least one car wash unit 802 that is in operable configuration with the server 546 via the network 544. The server 546 can be configured to determine and provide graphical communications associated with offers and/or discounts on car wash services to be performed by the at least one car wash unit 802. The system 800 can also include an end user interface 806 that is in operable communication with the server 546 and configured to receive the offers and/or discounts and to automatically determine, from the offers and/or discounts, which of the offers and/or discounts is most suitable based on the vehicle and/or the operator of the vehicle.

Figure 9:
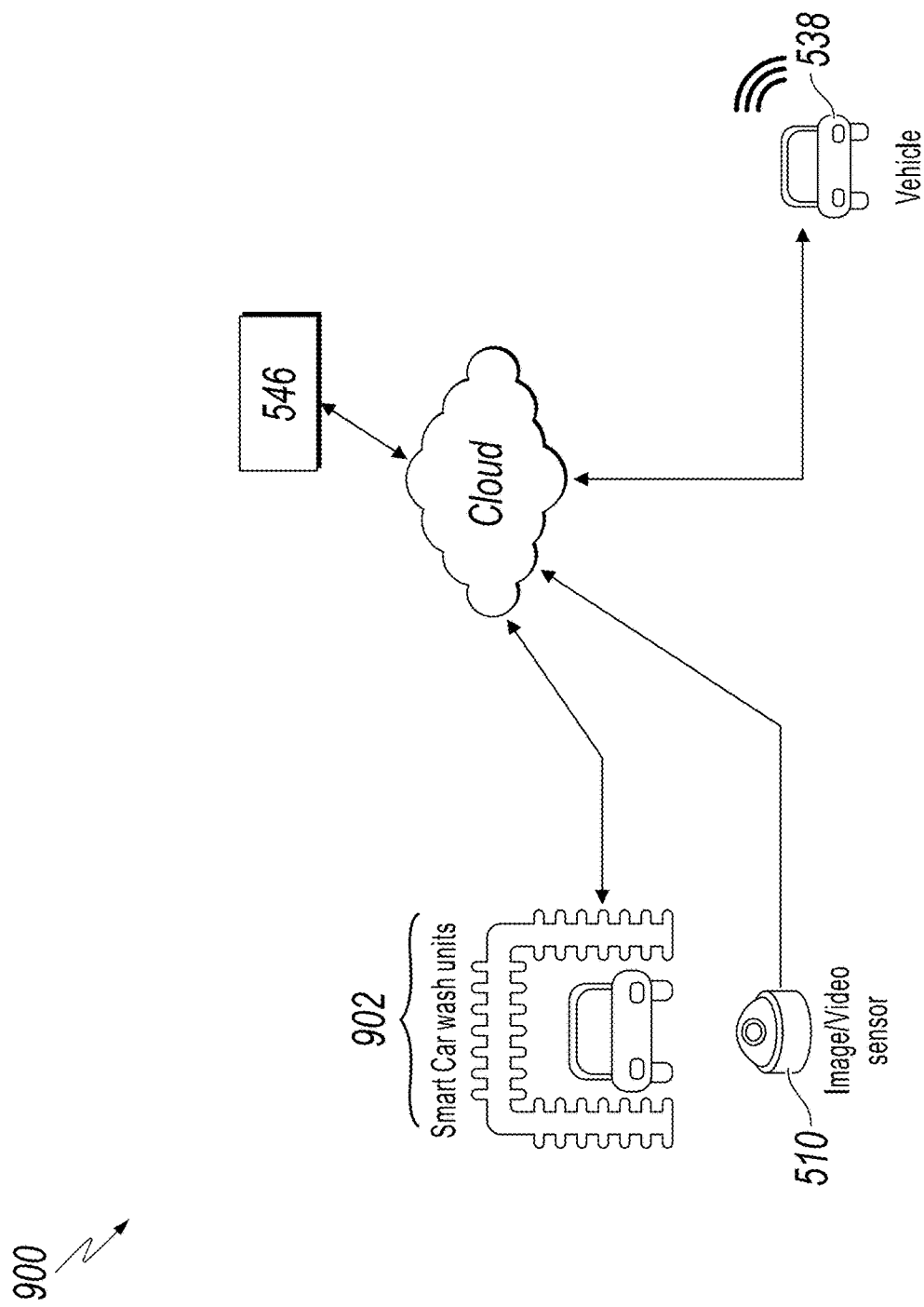
FIG. 9 is a diagram illustrating components of an example system for the optimized utilization and promotion of car wash services including a sensor for detecting the presence of a vehicle in a car wash bay.

The end user interface 806 can also include an input configured to permit the user to select a preferred offer within the graphical communication for transmission to the server 546. The preferred offer can be transmitted to the at least one car wash unit 802, which can perform at least one car wash service FIG. 9 is a schematic view illustrating components of an example system 900 for the optimized utilization and promotion of car wash services. System 900 includes at least one car wash unit 902, a server 546, and end user interface 538 of device 532, and an image/video sensor 510 capable of acquiring image or video data of the environs of the at least one car wash unit 902. In some implementations, the image/video sensor 510 can acquire image or video data of the at least one car wash unit 902 and the area surrounding the at least one car wash unit 902. The acquired image or video data can be processed by the server 546, using image processing algorithms known in the art, for example, to determine the presence of a vehicle in the at least one car wash unit 902 and to transmit a signal indicating the presence of the vehicle in the at least one car wash unit 902 to the server 546. Such processing can occur on a continuous basis or a discrete basis as needed. In some implementations, the processing can be performed by the at least one car wash unit 902 instead of, or in addition to, the server 546.

Furthermore, upon processing the image or video data of the at least one car wash unit 302, the car wash network 304 can analyze the processed data to determine various information items including, for example, the number of vehicles in line for the at least one car wash unit 302, the approximate time each vehicle spends in a car wash bay, and so on. The car wash network 304 can utilize this information to calculate an estimated idle time, i.e., an estimated time a hypothetical vehicle would wait in line for a car wash, in conjunction with other factors in some cases (e.g., current and historical individual car wash bay usage data), as described in detail hereinabove. The car wash network 304 can provide the estimated idle time to the end user interface 306 to inform the user of the same. Furthermore, the car wash network 304 can control or modify the offers and/or discounts to the end user interface 306 based on the estimated idle time. For example, the car wash network 304 can issue greater discounts at times when the idle time is low (e.g., below a predefined threshold) to encourage users to visit while the car wash is not busy, thereby optimizing the utilization of the car wash.

Figure 10:
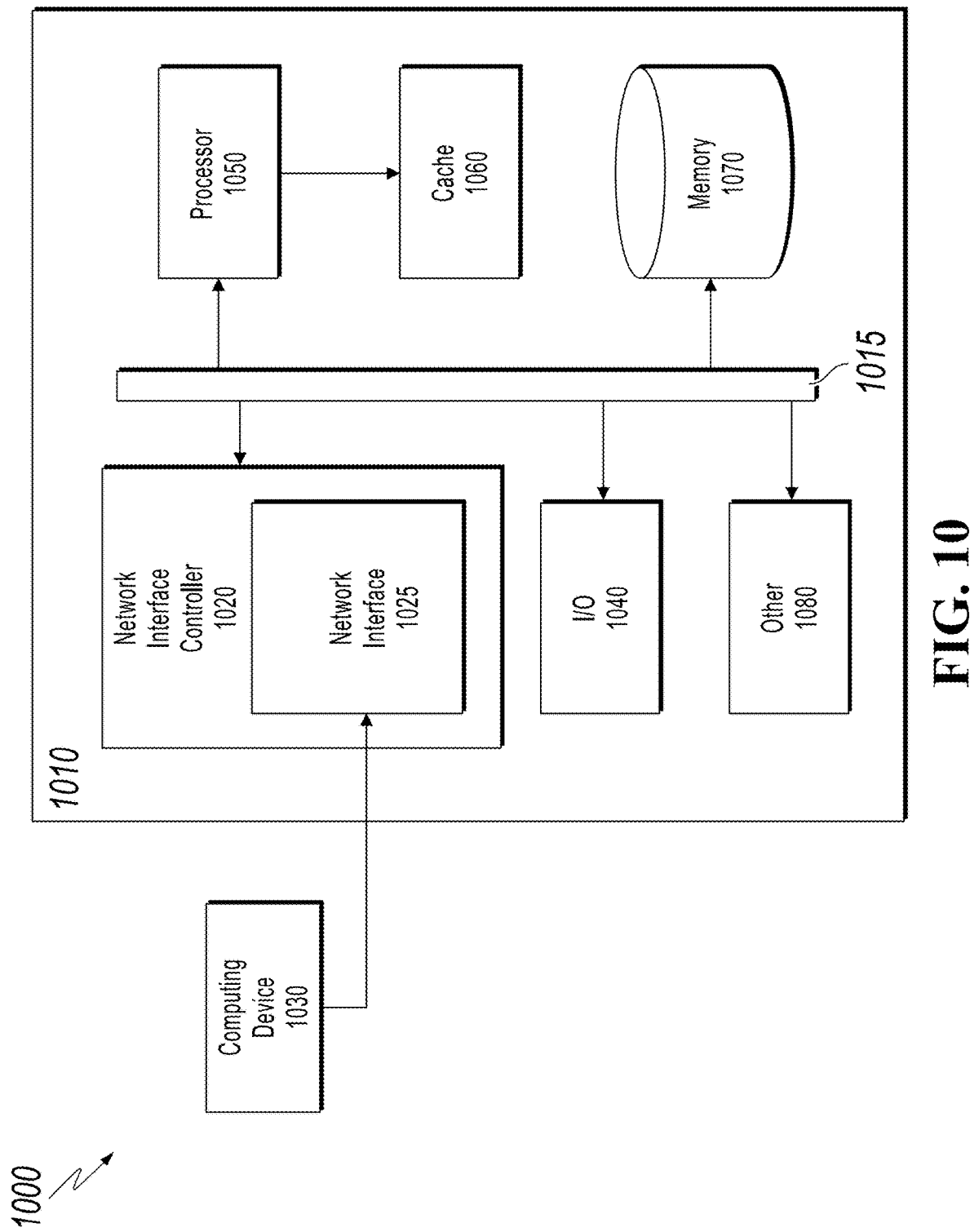
FIG. 10 is a diagram of an exemplary computing system in accordance with an illustrative implementation of the system of FIG. 5.

FIG. 10 is a block diagram 1000 of a computing system 1010 suitable for use in implementing the computerized components described herein, such as a computing device 522 configured within the dispenser 520 or server 546 as shown in FIG. 5. In broad overview, the computing system 1010 includes at least one processor 1050 for performing actions in accordance with instructions, and one or more memory devices 1060 and/or 1070 for storing instructions and data. The illustrated example computing system 1010 includes one or more processors 1050 in communication, via a bus 1015, with memory 1070 and with at least one network interface controller 1020 with a network interface 1025 for connecting to external devices 1030, e.g., a computing device (such as a computing device 522, or server 546). The one or more processors 1050 are also in communication, via the bus 1015, with each other and with any I/O devices at one or more I/O interfaces 1040, and any other devices 1080. The processor 1050 illustrated incorporates, or is directly connected to, cache memory 1060. Generally, a processor will execute instructions received from memory. In some embodiments, the computing system 1010 can be configured within a cloud computing environment, a virtual or containerized computing environment, and/or a web-based microservices environment.

In more detail, the processor 1050 can be any logic circuitry that processes instructions, e.g., instructions fetched from the memory 1070 or cache 1060. In many embodiments, the processor 1050 is an embedded processor, a microprocessor unit or special purpose processor. The computing system 1010 can be based on any processor, e.g., suitable digital signal processor (DSP), or set of processors, capable of operating as described herein. In some embodiments, the processor 1050 can be a single core or multi-core processor. In some embodiments, the processor 1050 can be composed of multiple processors.

The memory 570 can be any device suitable for storing computer readable data. The memory 1070 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 1010 can have any number of memory devices 1070.

The cache memory 1060 is generally a form of high-speed computer memory placed in close proximity to the processor 1050 for fast read/write times. In some implementations, the cache memory 1060 is part of, or on the same chip as, the processor 1050.

The network interface controller 1020 manages data exchanges via the network interface 1025. The network interface controller 1020 handles the physical, media access control, and data link layers of the Open Systems Interconnect (OSI) model for network communication. In some implementations, some of the network interface controller's tasks are handled by the processor 1050. In some implementations, the network interface controller 1020 is part of the processor 1050. In some implementations, a computing device 1010 has multiple network interface controllers 1020. In some implementations, the network interface 1025 is a connection point for a physical network link, e.g., an RJ 45 connector. In some implementations, the network interface controller 1020 supports wireless network connections and an interface port 1025 is a wireless Bluetooth transceiver. Generally, a computing device 1010 exchanges data with other network devices 1030, such as computing device 1030, via physical or wireless links to a network interface 1025. In some implementations, the network interface controller 1020 implements a network protocol such as LTE, TCP/IP Ethernet, IEEE 802.11, IEEE 802.16, Bluetooth, or the like.

The other computing devices 1030 are connected to the computing device 1010 via a network interface port 1025. The other computing device 1030 can be a peer computing device, a network device, a server, or any other computing device with network functionality. For example, a computing device 1030 can be a computing device 532 associated with a user of the dispenser 520, a server 546, or a network device 542 as illustrated in FIG. 5. In some embodiments, the computing device 1030 can be a network device such as a hub, a bridge, a switch, or a router, connecting the computing device 1010 to a data network such as the Internet.

In some uses, the I/O interface 1040 supports an input device and/or an output device (not shown). In some uses, the input device and the output device are integrated into the same hardware, e.g., as in a touch screen. In some uses, such as in a server context, there is no I/O interface 1040 or the I/O interface 1040 is not used. In some uses, additional other components 1080 are in communication with the computer system 1010, e.g., external devices connected via a universal serial bus (USB).

The other devices 1080 can include an I/O interface 1040, external serial device ports, and any additional co-processors. For example, a computing system 1010 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 1010, e.g., a touch screen on a tablet device. In some implementations, a computing device 1010 includes an additional device 1080 such as a co-processor, e.g., a math co-processor that can assist the processor 1050 with high precision or complex calculations.

Exemplary technical effects of the methods, systems, apparatuses, and non-transitory machine readable storage mediums described herein include, by way of non-limiting example, adaptively determining, generating, and providing graphical communications within a dispensing environment. This system and method can enable more effective generation and provision of graphical communications of promotional offers or advertisements associated with a dispensing environment that are customized for a vehicle operator and the operators vehicle. As a result, increased sales and revenue can be achieved while optimizing the utilization of services and product offering, such as car washes. Customer loyalty and brand recognition can be enhanced by providing curated graphical communications and vehicle operators can experience increased satisfaction about purchases and/or utilization of the dispensing environment.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a standalone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
  receiving, by a data processor of a server communicably coupled to at least one computing device within a fuel dispenser configured to dispense fuel to a vehicle in a fuel dispensing environment, first data characterizing the vehicle present within a forecourt of the fuel dispensing environment and second data characterizing an operator of the vehicle, wherein the first data and the second data comprise image data acquired by at least one sensor positioned within the forecourt of the fuel dispensing environment and communicably coupled to the at least one server;

determining, by the data processor, one or more attributes of the vehicle based on the first data;
determining, by the data processor, an identity of the operator based on the second data;
determining, by the data processor, third data characterizing at least one graphical communication including one or more graphical elements using a predictive algorithm comprising a first convolutional layer configured to receive the one or more attributes of the vehicle, a second convolutional layer configured to receive the identity of the operator, and a third convolutional layer configured to receive fourth data characterizing a likelihood the operator will provide an input selecting at least one graphical element of the one or more graphical elements included in the graphical communication, the predictive algorithm determining the third data characterizing the at least one graphical communication including one or more graphical elements based on outputs of the first, second, and third convolutional layers, wherein the at least one graphical communication is adapted based on at least one of previous inputs provided by the operator selecting the at least one graphical element, previous graphical communications for which the operator did not select the at least one graphical communication element, previous graphical communications for which other vehicle operators provided inputs selecting the at least one graphical communication element, and previous graphical communications for which other vehicle operators did not provide inputs selecting the at least one graphical element;
causing, by the data processor, the third data to be transmitted to the at least one computing device within the fuel dispenser; and
providing, by the at least one computing device, the graphical communication on a display screen of the fuel dispenser for viewing by the operator.

2. The method of claim 1, wherein the second data further includes loyalty program data received from the operator when the vehicle is within the forecourt, or loyalty program data received from the operator when the vehicle is remote from the forecourt.

3. The method of claim 1, wherein the one or more attributes of the vehicle further include a type of the vehicle, a size of the vehicle, or an amount of dirt on an exterior surface of the vehicle.

4. The method of claim 1, wherein the one or more attributes are determined using a first predictive model trained in a first machine learning process based on first training data including image data or video data of vehicles.

5. The method of claim 1, wherein the third data is determined using a second predictive model trained in a second machine learning process based on second training data including vehicle attribute data, the one or more graphical elements, the graphical communication, the likelihood the operator will provide the input selecting the at least one graphical element, and a frequency of operator inputs selecting the at least one graphical element included in the graphical communication.

6. The method of claim 1, wherein the at least one graphical element is associated with at least one of a car wash, a car wash discount, a food item, a food item discount, a volume of fuel, a fuel discount, a service, or a service discount.

7. The method of claim 1, wherein the second data is alternatively received from at least one second computing device in possession of the operator and the at least one graphical communication is transmitted to the at least one second computing device in possession of the operator.

8. The method of claim 1, wherein the at least one computing device is configured in a point-of-sale device configured in the fuel dispensing environment.

9. A system comprising:
a fuel dispenser configured to dispense fuel to a vehicle within a forecourt of a fuel dispensing environment and configured to receive user inputs, the fuel dispenser including at least one computing device within the fuel dispenser;
an image sensor positioned within the forecourt and communicatively coupled to the fuel dispenser;
a server communicably coupled to the image sensor and the at least one computing device, the server comprising at least one data processor and a memory storing instructions, which when executed, cause the at least one data processor to perform operations comprising:
receiving first data characterizing the vehicle present within the forecourt of the fuel dispensing environment and second data characterizing an operator of the vehicle, the first data and the second data including image data acquired via the image sensor;
determining one or more attributes of the vehicle based on the first data;
determining an identity of the operator based on the second data;
determining third data characterizing at least one graphical communication including one or more graphical elements using a predictive algorithm comprising a first convolutional layer configured to receive the one or more attributes of the vehicle, a second convolutional layer configured to receive the identity of the operator, and a third convolutional layer configured to receive fourth data characterizing a likelihood the operator will provide an input selecting at least one graphical element of the one or more graphical elements included in the graphical communication, the predictive algorithm determining the third data characterizing the at least one graphical communication including one or more graphical elements based on outputs of the first, second, and third convolutional layers, wherein the at least one graphical communication is adapted based on at least one of previous inputs provided by the operator selecting the at least one graphical element, previous graphical communications for which the operator did not select the at least one graphical communication element, previous graphical communications for which other vehicle operators provided inputs selecting the at least one graphical communication element, and previous graphical communications for which other vehicle operators did not provide inputs selecting the at least one graphical element; and
causing the third data to be transmitted to the at least one computing device within the fuel dispenser, wherein responsive to receiving the third data, the at least one computing device is configured to provide the at least one graphical communication for display on a display screen of the fuel dispenser for viewing by the operator.

10. The system of claim 9, wherein the second data further includes loyalty program data received from the operator when the vehicle is within the forecourt, or loyalty program data received from the operator when the vehicle is remote from the forecourt.

11. The system of claim 9, wherein the one or more attributes of the vehicle further include a type of the vehicle, a size of the vehicle, or an amount of dirt on an exterior surface of the vehicle.

12. The system of claim 9, wherein the one or more attributes are determined using a first predictive model trained in a first machine learning process based on first training data including image data or video data of vehicles.

13. The system of claim 9, wherein third data is determined using a second predictive model trained in a second machine learning process based on second training data including vehicle attribute data, the one or more graphical elements, the graphical communication, the likelihood the operator will provide the input selecting the at least one graphical element, and a frequency of operator inputs selecting the at least one graphical element included in the graphical communication.

14. The system of claim 9, wherein the at least one graphical element is associated with at least one of a car wash, a car wash discount, a food item, a food item discount, a volume of fuel, a fuel discount, a service, or a service discount.

15. The system of claim 9, wherein the at least one graphical communication is further determined based on at least one of an idle time of the vehicle within the dispensing environment, a time of day, a day of the week, a special event, a distance between the dispensing environment and a second dispensing environment, a location of the dispensing environment, a number of vehicle present within the dispensing environment, a car wash available time, or weather present at the fuel dispensing environment.

16. The system of claim 9, wherein the second data is alternatively received from at least one second computing device in possession of the operator and the at least one graphical communication is provided to the at least one second computing device in possession of the operator.

17. The system of claim 9, wherein responsive to providing the at least one graphical communication for display, the at least one computing device is further configured to receive input data from the operator, the input data selecting the at least one graphical element.

18. A computer-readable medium storing non-transitory computer-readable instructions, which when executed by a data processor, cause the data processor to perform operations comprising:

receiving first data characterizing a vehicle present within a forecourt of a fuel dispensing environment including a fuel dispenser configured to dispense fuel to the vehicle therein and second data characterizing an operator of the vehicle, the first data and the second data including image data acquired via an image sensor positioned within the forecourt of the fuel dispensing environment and communicatively coupled to the data processor;

determining one or more attributes of the vehicle based on the first data;

determining an identity of the operator based on the second data;

determining third data characterizing at least one graphical communication including one or more graphical elements using a predictive algorithm comprising a first convolutional layer configured to receive the one or more attributes of the vehicle, a second convolutional layer configured to receive the identity of the operator, and a third convolutional layer configured to receive fourth data characterizing a likelihood the operator will provide an input selecting at least one graphical element of the one or more graphical elements included in the graphical communication, the predictive algorithm determining the third data characterizing at least one graphical communication including one or more graphical elements based on outputs of the first, second, and third convolutional layers, wherein the at least one graphical communication is adapted based on at least one of previous inputs provided by the operator selecting the at least one graphical element, previous graphical communications for which the operator did not select the at least one graphical communication element, previous graphical communications for which other vehicle operators provided inputs selecting the at least one graphical communication element, and previous graphical communications for which other vehicle operators did not provide inputs selecting the at least one graphical element; and causing the third data to be transmitted to at least one computing device within the fuel dispenser configured in the fuel dispensing environment and communicatively coupled to the data processor, wherein responsive to receiving the third data, the at least one computing device is configured to provide the at least one graphical communication for display on a display screen of the fuel dispenser for viewing by the operator.

* * * * *